United States Patent [19]

Miller et al.

[11] Patent Number: 5,246,624
[45] Date of Patent: Sep. 21, 1993

[54] AQUEOUS COLLOIDAL DISPERSION OF FUMED SILICA, ACID AND STABILIZER

[75] Inventors: Dennis G. Miller, Urbana; William F. Moll, Crystal Lake, both of Ill.

[73] Assignee: Cabot Corporation, Boston, Mass.

[21] Appl. No.: 829,609

[22] Filed: Jan. 30, 1992

Related U.S. Application Data

[63] Continuation of Ser. No. 326,890, Mar. 21, 1989, abandoned.

[51] Int. Cl.$^5$ .................... B01J 13/00; C01B 33/14
[52] U.S. Cl. ................ 252/313.2; 252/310; 106/287.34; 423/336; 51/308
[58] Field of Search .............. 252/310, 313.2; 106/287.34; 65/901; 51/308; 423/336

[56] References Cited

U.S. PATENT DOCUMENTS

| | | | |
|---|---|---|---|
| 2,630,410 | 3/1953 | Clapsadle et al. | 252/313.2 |
| 2,951,044 | 8/1960 | Wagner et al. | 252/313.1 |
| 2,984,629 | 5/1961 | Loftman et al. | 252/313.2 |
| 3,455,718 | 7/1969 | Dithmar et al. | 252/313.2 X |
| 3,462,374 | 8/1969 | Klosak | 252/313.2 |
| 3,822,216 | 7/1974 | Schaefer | 106/287.34 X |
| 4,042,361 | 8/1977 | Bihuniak et al. | 65/21.5 X |
| 4,200,445 | 4/1980 | Bihuniak et al. | 65/21.5 X |
| 4,321,243 | 3/1982 | Cornwell et al. | 252/313.2 X |
| 4,624,800 | 11/1986 | Sasaki et al. | 252/313.2 |

FOREIGN PATENT DOCUMENTS 1326574 8/1973 United Kingdom ............ 252/313.2

OTHER PUBLICATIONS

Derwent Abstract, 71-46684S/28 (Corresponding to DT 1667460-R).
Derwent Abstract, 71-33208S/19 (Corresponding to GB 1 326 574-A).
Iler, Ralph K., *The Chemistry of Silica*, (John Wiley & Sons, New York, 1979) pp. 336–338.
Kirk-Othmer, Encyclopedia of Chemical Technology, 3rd Ed., vol. 20 (John-Wiley & Sons, NY) pp. 766–781.

*Primary Examiner*—Robert L. Stoll
*Assistant Examiner*—Daniel S. Metzmaier
*Attorney, Agent, or Firm*—Harry J. Gwinnell; David J. Koris; Michelle B. Lando

[57] ABSTRACT

An aqueous colloidal dispersion of fumed silica, acid and stabilizer, having a fumed silica concentration of at least about 40% by weight. A process for making an aqueous colloidal dispersion is also disclosed.

21 Claims, No Drawings

AQUEOUS COLLOIDAL DISPERSION OF FUMED SILICA, ACID AND STABILIZER

This is a continuation of copending application(s) Ser. No. 07/326,890 filed on Mar. 21, 1989 now abandoned.

FIELD OF THE INVENTION

The present invention relates to an aqueous colloidal dispersion of fumed silica, acid and stabilizer. A process for making such an aqueous colloidal dispersion is also disclosed.

BACKGROUND OF THE INVENTION

There are many applications for fumed silicas of extremely fine particle size in which it is convenient to apply the fumed silica in the form of an aqueous colloidal dispersion. Such applications include non-slip floor waxes, foamed rubber latices, paper coatings, the sol-gel process for the manufacture of optical fibers and quartz glassware, and thermal insulation. Aqueous colloidal dispersions of fumed silica are also utilized for frictionizing and polishing. There are also many occasions where it is convenient to densify fumed silica for storage or transport by combining the fumed silica with water to form an aqueous colloidal dispersion.

Fumed silica is generally produced by the vapor phase hydrolysis of chlorosilanes, such as silicon tetrachloride, in a hydrogen oxygen flame. The overall reaction is:

$$SiCl_4 + 2H_2 + O_2 \rightarrow SiO_2 + 4\ HCl$$

In this process, submicron sized molten spheres of silica are formed. These particles collide and fuse to form three dimensional, branched, chain-like aggregates, of approximately 0.1 to 0.5 microns in length. Cooling takes place very quickly, limiting the particle growth and insuring the fumed silica is amorphous. These aggregates in turn form agglomerates ranging in size from 0.5 to 44 microns (325 US mesh). Fumed silicas generally have very high purity, with total impurities, in many cases below 100 ppm (parts per million). This high purity makes fumed silica aqueous dispersions particularly advantageous for many applications.

Another consideration for many applications is the removal of grit from the aqueous dispersion of fumed silica since grit is a major source of impurities. Grit can also interfere with many applications of the dispersion. For example, in coagulation of latex rubber, grit will lead to the formation of defects in the structure of the rubber, and in the polishing of semiconductor single crystals grit can cause scratching. Thus it is generally desirable that the aqueous dispersion be of high purity. One method for increasing purity is to pass the aqueous colloidal dispersion through a filter, also referred to as filtering, to remove grit and other impurities. In order for an aqueous colloidal dispersion to be filterable, the viscosity of the colloidal dispersion must be low enough, and the colloidal dispersion must be non-dilatant to enable the colloidal dispersion to pass through the desired filter. For the purposes of the present invention, a non-dilatant dispersion is a dispersion which will pass through a filter having a pore size of 1000 microns or smaller.

As described above, the ability of a dispersion to pass through a filter is also related to the viscosity of a dispersion. The finer the filter, i.e. the smaller the size of the pores of the filter, the lower the viscosity of the aqueous colloidal dispersion must be to pass through the filter. As will be appreciated by those of ordinary skill in the art, to increase purity, the colloidal dispersion should be passed through as fine a filter as possible. Thus it is generally advantageous to produce aqueous colloidal dispersions with low viscosities. For the purposes of the present invention low viscosities are viscosities below about 1000 centipoise.

Additionally, in order to be useful for the applications listed above and other potential applications the aqueous colloidal dispersion cannot gel into a solid. The ability of the aqueous colloidal dispersion to resist gelling is generally referred to as the stability of the aqueous colloidal dispersion. More stable aqueous colloidal dispersions will not gel as soon as less stable aqueous colloidal dispersions.

SUMMARY OF THE INVENTION

The present invention is an aqueous colloidal dispersion of fumed silica, acid and stabilizer comprising at least about 40%, by weight, fumed silica, acid in an amount of between about 0.0025% and about 0.50% of the amount, by weight of the fumed silica, sufficient stabilizer to raise the pH of the dispersion to between about 7 and about 12, dispersed in water.

A process for producing aqueous colloidal dispersions of fumed silica, acid and stabilizer, and especially including those having fumed silica concentrations of at least about 40%, by weight is also disclosed. According to the present invention a stable, non-dilatant, low viscosity, filterable, aqueous colloidal dispersion of fumed silica is produced by dispersing fumed silica in an acid-water solution in a mixer in an amount such that the fumed silica concentration of the first dispersion, by weight, exceeds the amount of silica desired in the final dispersion, diluting the first dispersion in the mixer with an additional amount of water such that the resulting final dispersion contains the desired concentration of fumed silica, and then adding a stabilizer to adjust the pH of the final aqueous colloidal dispersion of fumed silica, acid and stabilizer to between about 7 and 12 and preferably between about 7.5 and about 11. This resulting final dispersion may optionally be filtered to remove grit and agglomerates.

The fumed silica wets and mixes quicker into the water-acid solution than into water alone. The addition of acid also reduces the viscosity of the aqueous colloidal dispersion of fumed silica in the mixer as the dispersion is adjusted from acidic to alkaline pH by the addition of the stabilizer. The reduced viscosity helps prevent the dispersion from gelling as the pH of the dispersion is raised by the stabilizer.

The process of the present invention may be used with fumed silica having any surface area in order to produce aqueous colloidal dispersions of fumed silica. In order to produce an aqueous colloidal dispersions of fumed silica having a fumed silica concentration of at least 40% by weight according to the present invention, however, preferably a fumed silica with a surface area below about 75 square meters per gram (sq.m/g), more preferably between about 10 sq.m/g and about 75 sq.m/g, most preferably between about 35 sq.m/g and about 60 sq.m./g, is utilized.

An advantage of the process of the present invention is that the resulting aqueous colloidal dispersions of fumed silica, acid and stabilizer are stable and non-dilatant. For the purposes of the present invention "stable"

means that the dispersion will not gel for a period of at least 1 day. Typically, the aqueous colloidal dispersions of fumed silica produced according to the process of the present invention are stable for a period of at least a week, preferably several weeks, and more preferably several months to years. As previously explained, for the purposes of the present invention "non-dilatant" refers to the ability of a dispersion to pass through a 1000 micron or smaller pore size filter without gelling. Typically the aqueous colloidal dispersions of fumed silica, produced according to the process of the present invention, will pass through a 250 micron or smaller pore size filter, preferably through a 25 micron or smaller pore size filter, and more preferably through a 10 micron or smaller pore size filter. Typically the "low viscosity" of the aqueous colloidal dispersions of fumed silica, produced according to the process of the present invention, will be below about 1000 centipoise, preferably below about 250 centipoise.

Another advantage of the present invention is that the aqueous colloidal dispersions of fumed silica, acid and stabilizer, having a fumed silica concentration of at least about 40%, by weight, are stable for a period of months to years, have low viscosities and are non-dilatant. The low viscosity and non-dilatant qualities permit the aqueous colloidal dispersion to pass through a fine filter.

Additional advantages of the present invention will become apparent from the following more detailed description of the invention.

DETAILED DESCRIPTION OF THE INVENTION

According to the present invention a mixer is charged, generally up to about 50%, with a quantity of water, preferably water which has been de-ionized, and acid is added to the water. Preferably the mixer utilized is a high shear mixer, capable of forming the dispersions, such as those generally known to the art. The acid may be a mineral or organic acid such as hydrochloric acid, sulfuric acid, nitric acid, phosphoric acid, acetic acid or maleic acid. The quantity of acid added to the water is based on the amount of fumed silica which will be added to the water to form the final aqueous colloidal dispersion. Generally the quantity of acid added to the water is an amount, by weight, between about 0.0025% and about 0.50%, and preferably between about 0.02% and 0.15% of the amount, by weight, of fumed silica which will be added to the water. After the addition of acid to the water the mixer may be operated to mix the acid and water to form a water-acid solution.

The percentage water initially charged to the mixer can obviously vary. However, as will become apparent from the following description, there must be room left in the mixer to add fumed silica and additional water. The initial quantity of water chosen is usually based on the amount of fumed silica to be added, and the desired final concentration of fumed silica in the aqueous colloidal dispersion. For example, if the desired final concentration of the aqueous colloidal dispersion of fumed silica is about 50% fumed silica, by weight, and 100 lbs. of fumed silica are to be added to the mixer, then the initial quantity of water is that quantity which will result in a greater than 50% by weight concentration of fumed silica in the mixer. Typically, in the process of the present invention the dispersion in the mixer, before dilution, will have a fumed silica concentration at least about 5% greater than the desired final concentration of fumed silica in the aqueous colloidal dispersion of fumed silica. Thereafter the aqueous colloidal dispersion in the mixer will be diluted by the addition of an additional amount of water to achieve the desired final concentration of fumed silica in the dispersion of about 50% by weight.

After the mixer is charged with water, and acid is added to the water, fumed silica is added to the water-acid solution in the mixer. The fumed silica may be added by mixing the fumed silica into the water-acid mixture while the mixer is operating, or by adding the fumed silica to the water-acid mixture and then operating the mixer. The fumed silica may also be added incrementally, in a series of steps, with the mixer operating between each step.

As previously discussed the process of the present invention may be utilized with fumed silicas having any surface areas. To produce aqueous colloidal dispersions of fumed silica having fumed silica concentrations at least about 40% by weight, preferably a fumed silica with a surface area less than about 75 sq.m/g is utilized. More preferably a fumed silica with a surface area between about 10 sq.m/g and about 75 sq.m/g is utilized, and most preferably a fumed silica with a surface area between about 35 sq.m/g and about 60 sq.m/g is utilized to form the aqueous colloidal dispersions of fumed silica having fumed silica concentrations of at least about 40% by weight.

The immediate effect of the addition, or each addition, of fumed silica to the mixer will be to thicken the aqueous colloidal dispersion of fumed silica in the mixer. As the mixer continues to operate however, the aqueous colloidal dispersion of fumed silica in the mixer will thin.

After the concentration of fumed silica, by weight, in the aqueous colloidal dispersion of fumed silica in the mixer has been raised to a point above the desired final concentration of fumed silica, by weight, the mixer is allowed to operate until the dispersion in the mixer thins. As previously explained, typically in the process of the present invention, the dispersion in the mixer, before dilution, will have a fumed silica concentration at least about 5% greater than the desired final concentration of fumed silica in the aqueous colloidal dispersion of fumed silica. Then an additional amount of water is added to the mixer to dilute the dispersion in the mixer. Preferably this additional water has been deionized. The additional water is then mixed into the aqueous colloidal dispersion in the mixer by operating the mixer. The amount of water added is the amount which will lower the concentration of fumed silica, by weight, of the aqueous colloidal dispersion of fumed silica in the mixer to the desired final concentration, taking into account the stabilizer which will be added to the dispersion.

After the additional water has been added, a stabilizer, such as an alkali or amine, is added to the aqueous colloidal dispersion of fumed silica in an amount which will adjust the pH of the final dispersion to between about 7 and about 12, preferably between about 7.5 and about 11. The particular pH chosen for the final dispersion will depend on the application for which the aqueous colloidal dispersion of fumed silica is designed. Suitable stabilizers include, but are not limited to, alkalis or amines such as sodium hydroxide, potassium hydroxide, lithium hydroxide, ammonium hydroxide, triethylamine, and dimethylethanol amine.

After the addition of stabilizer, the aqueous colloidal dispersion of fumed silica may be removed from the mixer, and stored or packaged for transport, in any of the manners generally known in the art. If desired, the aqueous colloidal dispersion of fumed silica may also be passed through a filter to remove grit and any agglomerated fumed silica particles.

The process of the present invention allows the production of stable, non-dilatant, low viscosity, high purity, filterable aqueous colloidal dispersion of fumed silica, acid and stabilizer of any fumed silica concentrations. It is particularly noteworthy that aqueous colloidal dispersions having a fumed silica concentration of at least about 40% by weight, and more preferably having a fumed silica concentration between about 40% and about 65% by weight, may be prepared. The resulting aqueous colloidal dispersions of fumed silica, acid and stabilizer are non-dilatant, have low viscosities, and are stable for a period of between several months to longer than a year.

The effectiveness and advantages of the present invention will be further illustrated by the following Examples. The following Examples illustrate the production of aqueous colloidal dispersions of fumed silica, acid and stabilizer, having fumed silica concentrations of about 40% and about 65%, by weight respectively. Obviously, however, the amounts of fumed silica, acid, stabilizer, and water used in these examples can be varied to produce aqueous colloidal dispersion of fumed silica with different fumed silica concentrations such as 45%, 50%, 55%, and 60% by weight.

EXAMPLE 1

The following Example illustrates the preparation of an aqueous colloidal dispersion of fumed silica, acid and stabilizer having a fumed silica concentration of about 40% by weight using a 100 gallon capacity high shear mixer capable of forming the dispersions.

The high shear mixer is initially charged with 40 gallons of water and about 1.35 lbs of a 37% solution of HCl, which is about 0.1% of the amount, by weight, of the fumed silica which will be added to the mixer, are added to the water. About 500 lbs of fumed silica, having a surface area of about 50 sq.m/g, is slowly added to the mixer, 100 lbs at a time, while the mixer is operating, to form an aqueous colloidal dispersion of fumed silica in the mixer having a fumed silica concentration of about 60% by weight. At this point, 47 additional gallons of water are slowly added to the mixer, while the mixer is operating, to form an aqueous colloidal dispersion of fumed silica having a fumed silica concentration of about 41% by weight. A sufficient amount of ammonium hydroxide, which in this instance is about 2.8 gallons of a 30% ammonium hydroxide solution, is added to this aqueous colloidal dispersion of fumed silica to adjust the pH of the dispersion to about 10.4. After the addition of the ammonium hydroxide the resulting aqueous colloidal dispersion of fumed silica has a fumed silica concentration of about 40% by weight and may optionally be filtered to remove any grit or agglomerated particles. Filtering the aqueous colloidal dispersion will change the fumed silica concentration less than about 0.5% by weight. The filtered or unfiltered aqueous colloidal dispersion of fumed silica, acid and stabilizer may be stored, and/or packaged for transport, in any of the manners generally known in the art.

EXAMPLE 2

The following Example illustrates the preparation of an aqueous colloidal dispersion of fumed silica, acid and stabilizer having a fumed silica concentration of about 65% by weight using a 100 gallon capacity high shear mixer capable of forming the dispersions.

The high shear mixer is initially charged with 26 gallons of water and about 1.35 lbs of a 37% solution of HCl, which is about 0.1% of the amount, by weight, of fumed silica which will be added to the mixer, are added to the water. About 500 lbs of fumed silica, having a surface area of about 50 sq.m/g, is slowly added to the mixer, 100 lbs at a time, while the mixer is operating, to form an aqueous colloidal dispersion of fumed silica in the mixer having a fumed silica concentration of about 70% by weight. At this point, 4.2 additional gallons of water are slowly added to the mixer, while the mixer is operating, to form an aqueous colloidal dispersion of fumed silica having a fumed silica concentration of about 66.5% by weight. A sufficient amount of ammonium hydroxide, which in this instance is about 2.8 gallons of a 30% ammonium hydroxide solution, is added to this aqueous colloidal dispersion of fumed silica to adjust the pH of the dispersion to about 10.4. After the addition of ammonium hydroxide the resulting aqueous colloidal dispersion of fumed silica has a fumed silica concentration of about 65% by weight and may optionally be filtered to remove any grit or agglomerated particles. Filtering the aqueous colloidal dispersion will change the fumed silica concentration less than about 0.5% by weight. The filtered or unfiltered aqueous colloidal dispersion of fumed silica, acid and stabilizer may be stored, and/or packaged for transport, in any of the manners generally known in the art.

Similar results have been obtained by following the procedures of Examples 1 and 2 and by varying the initial amount the mixer is charged with water, the amount of acid, and the amount of additional water added to the mixer to produce aqueous colloidal dispersions of fumed silica, acid, and stabilizer with fumed silica concentrations of 45%, 50%, 55%, and 60% by weight.

Numerous modifications and variations may obviously be made in the above described Examples without departing from the present invention. Accordingly, it should be clearly understood that the forms of the present invention herein described are illustrative only and are not intended to limit the scope of the invention. The present invention includes all modifications falling within the scope of the following claims.

We claim:

1. An aqueous high solids fumed silica colloidal dispersion product prepared by the process of:
   providing a volume of water defining at least a portion of the continuous aqueous phase of said colloidal dispersion product;
   preselecting the concentration of fumed silica to form the discontinuous phase of the colloidal dispersion product, said preselected concentration being at least 40% by weight thereof;
   mixing a mineral or organic acid into said volume of water in an amount corresponding to between about 0.0025% and about 0.5% by weight of the fumed silica required to provide said preselected concentration, thereby to preacidify said volume of water;

dispersing fumed silica into said preacidified volume of water in an amount at least sufficient to provide said preselected concentration and under sufficiently high shear mixing conditions as to form an acidic aqueous colloidal dispersion of said silica;

mixing a pH raising stabilizer into said acidic aqueous colloidal dispersion of said silica in an amount sufficient to being the pH of the dispersion to between about 7.0 and about 12.0; and collecting the resulting stabilized aqueous colloidal fumed silica dispersion as product;

wherein the dispersion will not gel for a period of at least 1 day, has a viscosity of below about 1000 centipoise, and is non-dilatant.

2. The colloidal dispersion product of claim 1 wherein the fumed silica is present in an amount between about 40% and 65% by weight.

3. The colloidal dispersion product of claim 1 wherein the fumed silica is present in an amount of about 40% by weight.

4. The colloidal dispersion product of claim 1 wherein the fumed silica is present in an amount of about 45% by weight.

5. The colloidal dispersion product of claim 1 wherein the fumed silica is present in an amount of about 50% by weight.

6. The colloidal dispersion product of claim 1 wherein the fumed silica is present in an amount of about 55% by weight.

7. The colloidal dispersion product of claim 1 wherein the fumed silica is present in an amount of about 60% by weight.

8. The colloidal dispersion product of claim 1 wherein the fumed silica is present in an amount of about 65% by weight.

9. The colloidal dispersion product of claim 1 wherein the acid is selected from the group consisting of mineral acids and organic acids.

10. The colloidal dispersion product of claim 1 wherein the acid is selected from the group consisting of hydrochloric acid, sulfuric acid, nitric acid, phosphoric acid, acetic acid and maleic acid.

11. The colloidal dispersion product of claim 1 wherein the acid is hydrochloric acid.

12. The colloidal dispersion product of claim 1 wherein the acid is present in an amount between 0.02% and about 0.15% of the amount by weight of the fumed silica.

13. The colloidal dispersion product of claim 1 wherein the acid is selected from the group consisting of alkalis and amines.

14. The colloidal dispersion product of claim 1 wherein the acid is selected from the group consisting of sodium hydroxide, potassium hydroxide, lithium hydroxide, ammonium hydroxide, triethylamine, and dimethylethanol amine.

15. The colloidal dispersion product of claim 1 wherein the stabilizer is ammonium hydroxide.

16. The colloidal dispersion product of claim 11 wherein the stabilizer is ammonium hydroxide.

17. The colloidal dispersion product of claim 1 wherein the stabilizer is added in an amount which raises the $p^H$ of the dispersion to between about 7.5 to about 11.

18. The colloidal dispersion product of claim 1 wherein the fumed silica has a surface area less than about 75 sq.m/g.

19. The colloidal dispersion product of claim 1 wherein the fumed silica has a surface area between about 10 sg.m/g and about 75 sg.m/g.

20. The colloidal dispersion product of claim 1 wherein the fumed silica has a surface area of about 50 sg.m/g.

21. The colloidal dispersion product of claim 1 wherein the amount of fumed silica dispersed in said volume of preacidified water in said dispersing step is at least about 5% greater than said preselected silica concentration of the final dispersion product and wherein, following said dispersing step and preceding said stabilizing step, sufficient additional water is mixed into said acidic colloidal dispersion to dilute same to said preselected silica concentration.

* * * * *